US008961655B2

(12) United States Patent
Al-Zeghayer et al.

(10) Patent No.: US 8,961,655 B2
(45) Date of Patent: Feb. 24, 2015

(54) PHOTOCATALYST COMPRISING TIO₂ AND ACTIVATED CARBON MADE FROM DATE PITS

(75) Inventors: Yousef Saleh Al-Zeghayer, Jeddah (SA); Sami M. Bashir, Jeddah (SA); Ahmed V. Yaser, Jeddah (SA); Hassan M. El Dekki, Jeddah (SA); Waheed A. Al-Masry, Jeddah (SA); Fadi M. Trabzuni, Jeddah (SA)

(73) Assignee: The National Titanium Dioxide Co. Ltd. (CRISTAL), Jeddah (SA)

( * ) Notice: Subject to any disclaimer, the term of this patent is extended or adjusted under 35 U.S.C. 154(b) by 106 days.

(21) Appl. No.: 13/549,832

(22) Filed: Jul. 16, 2012

(65) Prior Publication Data

US 2012/0279849 A1 Nov. 8, 2012

Related U.S. Application Data

(62) Division of application No. 13/350,952, filed on Jan. 16, 2012, now Pat. No. 8,785,349, which is a division of application No. 12/725,010, filed on Mar. 16, 2010, now Pat. No. 8,178,065.

(51) Int. Cl.
| | | |
|---|---|---|
| B01D 53/72 | (2006.01) | |
| B01J 20/32 | (2006.01) | |
| B01J 37/02 | (2006.01) | |
| B01J 21/18 | (2006.01) | |
| B01J 35/00 | (2006.01) | |
| C01B 31/08 | (2006.01) | |
| B01D 53/86 | (2006.01) | |
| B01J 20/06 | (2006.01) | |
| B01J 20/20 | (2006.01) | |
| C01B 31/10 | (2006.01) | |

(52) U.S. Cl.
CPC ......... B01D 53/8668 (2013.01); B01J 20/3204 (2013.01); B01J 37/0201 (2013.01); *B01D 2255/702* (2013.01); *B01D 2257/7027* (2013.01); *B01D 2257/7022* (2013.01); B01J 21/18 (2013.01); B01J 20/3236 (2013.01); *B01D 2259/802* (2013.01); *B01D 2255/802* (2013.01); *B01D 2255/20707* (2013.01); B01J 35/004 (2013.01); C01B 31/081 (2013.01); B01J 20/06 (2013.01); B01J 20/20 (2013.01); *B01D 2259/804* (2013.01); C01B 31/10 (2013.01)
USPC .......................................................... 95/141

(58) Field of Classification Search
USPC ........................................................... 95/141
See application file for complete search history.

(56) References Cited

U.S. PATENT DOCUMENTS

| | | | |
|---|---|---|---|
| 4,629,570 A * | 12/1986 | Kennedy, Jr. ................. | 210/666 |
| 5,614,459 A | 3/1997 | Mondragon et al. | |
| 6,057,262 A | 5/2000 | Derbyshire et al. | |
| 6,248,691 B1 * | 6/2001 | Gadkaree et al. ............ | 502/423 |
| 7,179,382 B2 | 2/2007 | Hiltzik et al. | |
| 7,407,121 B2 | 8/2008 | Kerns et al. | |
| 2007/0149397 A1 | 6/2007 | Tseng et al. | |
| 2011/0229395 A1 | 9/2011 | Al-Zeghayer et al. | |

FOREIGN PATENT DOCUMENTS

JP 2002-066332 3/2002

OTHER PUBLICATIONS

Notification of Transmittal of the International Search Report and the Written Opinion of the International Searching Authority, or the Declaration, Form PCT/ISA/220, dated Nov. 29, 2011, from PCT/US2011/025388.
International Search Report, Form PCT/ISA/210, dated Nov. 29, 2011, transmitted with Form PCT/ISA/220, 3 pages from PCT/US2011/025388.
Written Opinion of the International Searching Authority, Form PCT/ISA/237, dated Nov. 29, 2011, transmitted with Form PCT/ISA/220, 3 pages from PCT/US2011/025388.
Haimour et al., Utilization of date stones for production of activated carbon using phosphoric acid, Waste Manag. 2006:26(6): 651-60 (Oct. 26, 2005) (Abstract Only).
Girgis et al., Porosity development in activated carbons obtained from date pits under chemical activation with phosphoric acid, Microporous and Mesophorous Materials 52: 105-117 (Jan. 1, 2002).
Notification Concerning Transmittal of International Preliminary Report on Patentability, Form PCT/IB1326, dated Sep. 27, 2012, from PCT/US2011/025388.
International Preliminary Report on Patentability, Form PCT/IB/373, dated Sep. 18, 2012, from PCT/US2011/025388, transmitted with Form PCT/IB/326 on Sep. 27, 2012.
N.M. Haimour et al., "Utilization of date stones for production of activated carbon using phosphoric acid," Waste Management 26, Oct. 26, 2005, pp. 651-660, Elsevier Ltd.
Hu, et al. "A simple method for developing mesoporosity in activated carbon," Separation and Purification Technology (2003), pp. 47-52, vol. 31, Elsevier Science B.V.
Banat, et al. "Evaluation of the use of raw and activated date pits as potential adsorbents for dye containing waters," Process Biochemistry (2003), pp. 193-202, vol. 39, Elsevier Ltd.
Extended European Search Report for Application No. EP 11756698.4 published by the EPO, dated of Sep. 19, 2014, including corresponding Communication, Annex, and 8-page EPO Form 1703.
Final Office Action Dated Aug. 14, 2014, for related U.S. Appl. No. 13/350,977.

* cited by examiner

*Primary Examiner* — Stuart Hendrickson
(74) *Attorney, Agent, or Firm* — Kilyk & Bowersox, P.L.L.C.

(57) ABSTRACT

A method is provided for adsorbing organic molecules, pollutants, or both, by contacting the organic molecules, pollutants, or both, with a photocatalyst. The photocatalyst can be made by a method that includes preparing activated carbon by calcining date pits to form a precursor material, and then impregnating the precursor material with titanium dioxide.

19 Claims, 4 Drawing Sheets

PHOTOCATALYST COMPRISING TIO$_2$ AND ACTIVATED CARBON MADE FROM DATE PITS

CROSS-REFERENCE TO RELATED APPLICATIONS

This application is a divisional of U.S. patent application Ser. No. 13/350,952, filed Jan. 16, 2012, now U.S. Pat. No. 8,785,349 B2, which in turn is a divisional of U.S. patent application Ser. No. 12/725,010, filed Mar. 16, 2010, now U.S. Pat. No. 8,178,065 B2, all of which are incorporated herein in their entireties by reference.

FIELD

The present teachings relate to photocatalysts suitable for the adsorption and decomposition of organic molecules and environmental pollutants.

BACKGROUND

Photocatalysis relates to the phenomenon of transforming light energy into chemical energy. There are many materials, such as, $SrTiO_3$, $ZnO$, $ZnS$, $CdS$, and $TiO_2$, for example, that are considered to be efficient photocatalysts. $TiO_2$ is characterized by having an energy band gap in the range between 3 and 3.2 eV. Light energy and the electron band gap energy of $TiO_2$ are compatible or equivalent to ensure effective interaction of $TiO_2$ material with UV light. $TiO_2$, as a photo-active material, can therefore, efficiently utilize energy from sunlight and transcend in photocatalyzing chemical reactions. For instance, absorption of a photon by a $TiO_2$ crystal enables excitation of an electron ($e^-$) from the valence band to the conduction band if the photon energy, $h_\nu$, equals or exceeds the band gap energy of $TiO_2$. Simultaneously, an electron vacancy or a positively charged hole ($h^+$) is generated in the valence band:

$$h_\nu + TiO_2 \rightarrow e^- + h^+$$

The electron-hole pair ($e^- + h^+$) that is created migrates to the $TiO_2$ photocatalyst surface triggering redox reactions to take place with compounds adsorbed to the surface of the photocatalyst and/or in the surrounding medium. For $TiO_2$, photo-generated positive holes have redox potential of ca. 2.5 eV against normal hydrogen electrode (NHE), this potential allows production of hydroxyl radicals from water. Whereas, the redox potential of photo-generated electrons (−0.52 eV) is capable of reducing oxygen $O_2$ to superoxide ($O_2^-$) or hydrogen peroxide ($H_2O_2$). Hence, there are sufficient redox potentials to initiate a chain of redox reactions that can lead to decomposition of most organic molecules.

Thus, because of its inherent photoactivity, $TiO_2$ can be an efficient photocatalyst. A need exists, however, for a photocatalyst that can adsorb and decompose organic molecules and/or environmental pollutants. In particular, a need exists for a substrate that can be used with $TiO_2$ to provide a photocatalyst that can efficiently adsorb and decompose organic molecules and/or environmental pollutants. Furthermore, a need exists for an economical and environmentally friendly technique for producing such a substrate.

SUMMARY

Features and advantages of the present teachings will become apparent from the following description. This description, which includes drawings and examples of specific embodiments, provides a broad representation of the present teachings. Various changes and modifications to the teachings will become apparent to those skilled in the art from this description and by practice of the teachings.

The present teachings relate to a photocatalyst comprising $TiO_2$ and activated carbon. The activated carbon can be produced from date pits. The activated carbon can have a porous surface that is particularly useful for attracting and holding pollutants flowing in air or water. $TiO_2$ can be photoactive and can have the ability to trigger redox reactions. The photoactivity of $TiO_2$ and its ability to trigger redox reactions and the adsorption ability of the activated carbon make the photocatalyst particularly suitable for adsorption and decomposition of organic molecules and/or environmental pollutants.

According to some embodiments, the activity and adsorption of activated carbon produced from date pits can be comparable to that of activated carbon produced from conventional precursor materials, such as wood, coal, or coconut shells. Date pits can provide a particularly ideal precursor for manufacturing activated carbon because of the high content of carbonaceous material in date pits. Date pits are generally removed during industrial processing of dates. Thus, date pits can be obtained in copious amounts with little cost, especially in parts of the world where dates are widely grown. According to some embodiments, date pits can provide an environmentally safe and economical carbonaceous precursor for manufacturing activated carbon.

The present teachings further relate to a method comprising contacting date pits with an acidic aqueous solution, to form treated date pits, and calcining the treated date pits under conditions to cause the treated date pits to thermally decompose and form activated carbon. According to one or more embodiments, an acidic aqueous solution can comprise a phosphoric acid solution. In some embodiments, the phosphoric acid solution can comprise a concentration of from about 1% to about 30% phosphoric acid. The treated date pits can be treated at a temperature of from about 80° C. to about 150° C., for a period of from about one hour to about twelve hours, to dry the treated date pits, prior to the calcining. The calcining can occur at a temperature of from about 300° C. to about 900° C. The calcining can be conducted under a nitrogen blanket to form a calcined product. The calcined product can be treated with carbon dioxide gas. In some embodiments, the activated carbon can be impregnated with titanium dioxide, to form an impregnated product. A precursor compound can be contacted with the impregnated compound to photocatalyze a chemical reaction.

In some embodiments, the present teachings provide a method for adsorbing organic molecules, pollutants, or both, by contacting the organic molecules, pollutants, or both, with a photocatalyst comprising the impregnated product.

In some embodiments, the present teachings provide a photocatalyst comprising the impregnated product.

In some embodiments, the present teachings provide activated carbon made from the method comprising contacting date pits with an acidic aqueous solution, to form treated date pits, and calcining the treated date pits under conditions to cause the treated date pits to thermally decompose and form activated carbon.

BRIEF DESCRIPTION OF THE DRAWINGS

The accompanying drawings, which are incorporated into and constitute a part of the specification, illustrate specific embodiments of the invention, and taken in conjunction with the detailed description of the specific embodiments, serve to explain the principles of the invention.

DETAILED DESCRIPTION

Figure 1:
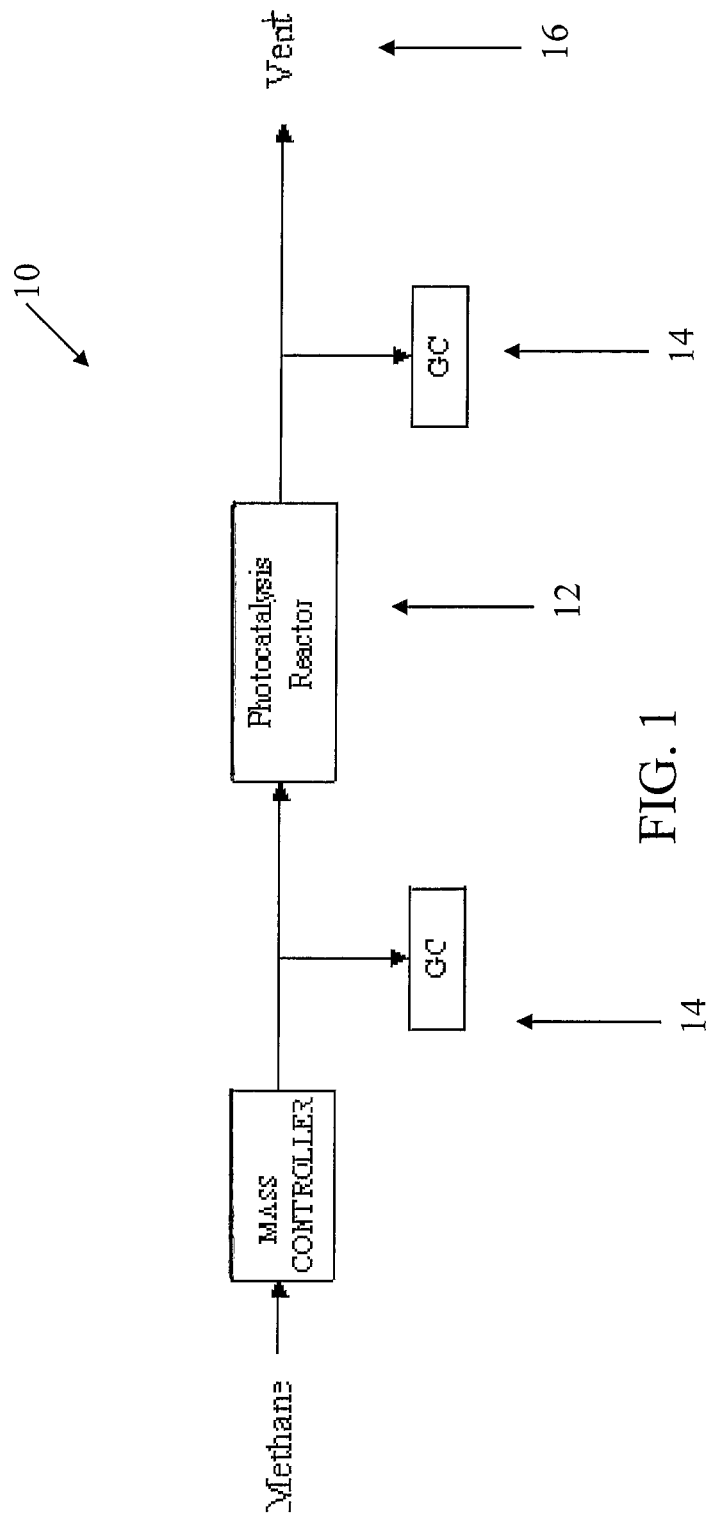
FIG. 1 is a schematic diagram showing a photocatalysis reaction setup comprising an open flow system used for testing catalytic activity, according to various embodiments of the present teachings.

The following detailed description serves to explain the principles of the present teachings. The present teachings are susceptible to modifications and alternative forms and are not limited to the particular forms disclosed herein. The present teachings cover modifications, equivalents, and alternatives.

According to various embodiments of the present teachings, a method is provided that comprises contacting date pits with an acidic aqueous solution, to form treated date pits, and calcining the treated date pits under conditions to thermally decompose the pits and form activated carbon. The acidic aqueous solution can comprise, for example, a phosphoric acid solution. The concentration of the acidic aqueous solution can comprise an acidic component present in an amount of from about 1% by weight to about 40% by weight, for example, from about 1% by weight to about 30% by weight, about 3% by weight to about 25% by weight, or from about 5% by weight to about 20% by weight. In an exemplary embodiment, the acidic aqueous solution comprises phosphoric acid present in an amount of from about 1% to about 30%, for example, from about 5% by weight to about 20% by weight.

According to one or more embodiments, the acidic aqueous solution can comprise a phosphoric acid ($H_3PO_4$) solution. In some embodiments, the phosphoric acid solution can comprise a concentration of from about 1% to about 30% phosphoric acid, for example, from about 5% to about 30%, from about 10% to about 20%, or from about 15% to about 25% phosphoric acid. In some embodiments, the phosphoric acid solution can comprise a concentration of about 5%, 10%, 15%, 20%, or 25% phosphoric acid. In some embodiments, other acids such as sulfuric acid, hydrochloric acid, and the like, can be used.

In some embodiments, the treated date pits are heated to a temperature of from about 80° C. to about 150° C., for a period of from about 1 hour to about 12 hours, to dry the treated date pits, prior to the calcining. The calcining can occur at a temperature of from about 200° C. to about 1,000° C., for example, from about 300° C. to about 900° C., from about 400° C. to about 800° C., or from about 500° C. to about 700° C. The calcining can be conducted under a nitrogen blanket. In some embodiments, the calcining is conducted under a nitrogen blanket to form a calcined product, and the method further can further comprise treating the calcined product with carbon dioxide gas.

For drying, the treated date pits can be treated at a temperature of from about 80° C. to about 150° C., for example, at a temperature of from about 85° C. to about 120° C., or from about 90° C. to about 100° C. The treated date pits can be dried for a period of from about one hour to about twelve hours, for example, from about two hours to about eight hours, from about three hours to about seven hours, or from about four hours to about six hours. In some embodiments, the treated date pits can be dried for about six hours at a temperature of about 120° C. Drying can take place at ambient pressure or at an elevated or reduced pressure.

The treated date pits can be calcined under conditions to cause the treated date pits to thermally decompose and form activated carbon. The treated product can be calcined in a manner familiar to those of skill in the art. In some embodiments, both a drying step and a calcination step can be carried out at the same time, together. In some embodiments, calcining can be carried out after drying to form activated carbon. The calcining can occur at a temperature of from about 300° C. to about 900° C., for example, at a temperature of from about 400° C. to 800° C. or at a temperature of from about 500° C. to 750° C. The calcining can be carried out for a period of time of from one hour to four hours, for example, from one hour to three hours or from one hour to two hours. The calcining can be conducted under a nitrogen blanket.

After calcining to form a calcined product, the calcined product can be treated with a gas, for example, with carbon dioxide gas. The gas treatment can be carried out at an elevated pressure, at a reduced pressure, or at ambient pressure. In some embodiments, the calcined product can be pulverized, granulated, screened, and/or otherwise treated to form a desired particle size and/or uniformity.

According to various embodiments, a photocatalyst can be made by impregnating the activated carbon made as described herein, with titanium dioxide, to form an impregnated product. A method can be provided for photocatalyzing a chemical reaction by contacting a precursor compound with the impregnated product. In some embodiments, a method is provided that comprises adsorbing organic molecules, pollutants, or both, by contacting the organic molecules, pollutants, or both, with the photocatalyst.

In some embodiments, the photocatalyst can be made by first preparing activated carbon using date pits as a precursor material, and then impregnating the activated carbon with $TiO_2$. The activated carbon can be prepared by contacting date pits with an acidic aqueous solution, to form treated date pits.

According to various embodiments, the photocatalyst can be prepared by mixing $TiO_2$ with the activated carbon under conditions sufficient to impregnate the activated carbon with $TiO_2$. According to some embodiments, the photocatalysts prepared by mixing $TiO_2$ and the activated carbon can exhibit enhanced affinity to adsorption of organic molecules, such as alkanes and phenols. In some embodiments, $TiO_2$ in a solution can be mixed with the activated carbon to form a mixture. According to some embodiments, the concentration of $TiO_2$ in the mixture can be from about 10% by weight to about 50% by weight, for example, from about 15% to about 40%, or from about 20% to about 30%, by weight. The mixture can be heated for a period of from one to five hours, for example, from one to four hours, or from one to three hours, and then dried. The mixture can be heated at a temperature of from about 70° C. to about 200° C., for example, at a temperature of from about 80° C. to 100° C. or at a temperature of from about 90° C. to 150° C.

According to some embodiments, the photocatalyst can comprise $TiO_2$ particles having one or more sizes, and/or one or more polymorph forms. Examples of $TiO_2$ products that can be used include those available from National Titanium Dioxide Company, Ltd. (Yanbu Al-Sinaiyah, Saudi Arabia), for example, as described in U.S. patent application Ser. No. 12/584,699, filed Sep. 10, 2009, which is incorporated herein in its entirety by reference. The $TiO_2$ can have an average particle size of from about 0.005 μm to 1 μm, for example, from 0.005 μm to 0.75 μm, from 0.01 μm to 0.6 μm, from 0.1 μm to 0.5 μm, from 0.2 μm to 0.4 μm, or about 0.3 μm. According to various embodiments, any suitable crystalline polymorph of $TiO_2$ can be used. In some embodiments, $TiO_2$ in rutile and/or anatase form can be used. According to some embodiments, the $TiO_2$ particles can be doped with one or more cationic and/or anionic species. Exemplary dopants that can be used include, but are not limited to, $Na^+$, $Cl^-$, and $Al^{3+}$. According to some embodiments, prior to mixing with the activated carbon, the $TiO_2$ can have a surface acidity of from about pH 3.6 to about pH 12.8, for example, from about pH 3.8 to about pH 10.5, or from about pH 4.0 to about pH 7.7.

In addition to methods, the present teachings also provide impregnated products, for example, made by the methods described herein, activated carbon made from the methods described herein, and photocatalysts made by the methods described herein.

According to various embodiments, a photocatalyst can comprise titanium dioxide ($TiO_2$) and activated carbon that is produced from date pits. Table 1 shows approximate values of date pit constituents. As shown in Table 1, date pits can comprise a high content of carbonaceous material.

TABLE 1

Composition of Exemplary Date Pits

| | |
|---|---|
| Moisture | 5-10% |
| Protein (N × 6.25) | 5-7% |
| Oil | 7-10% |
| Crude fiber | 10-20% |
| Carbohydrates | 55-65% |
| Ash | 1-2% |

The date pits can, for example, be immersed in the acidic aqueous solution for a period of about one hour to about twenty four hours, for example, for about eight hours to about fifteen hours, or from about ten hours to about twenty hours.

Finely divided $TiO_2$ can be used to impregnate the carbonaceous, soaked, dried, and calcined date pit material. Table 2 below shows exemplary $TiO_2$ materials (Samples Nos. 1-15) that can be used to form the photocatalysts of the present teachings. Table 2 also shows corresponding properties of each of the exemplary $TiO_2$ materials.

TABLE 2

Properties of Exemplary $TiO_2$ materials for Preparation of Photocatalysts

| $TiO_2$ Sample | pH | Particle Size Mm | Crystalline Polymorph | Dopants |
|---|---|---|---|---|
| 1 | 4.30 | 0.3-0.6 | rutile | $Cl^-$ & $Al^{3+}$ |
| 2 | 4.20 | 0.5-1.0 | rutile | $Cl^-$ & $Al^{3+}$ |
| 3 | 4.00 | 0.1-0.4 | rutile | $Cl^-$ & $Al^{3+}$ |
| 4 | 4.50 | 0.2-0.5 | rutile | $Cl^-$ & $Al^{3+}$ |
| 5 | 4.60 | 0.005-0.1 | anatase | $Cl^-$ |
| 6 | 7.10 | 0.3-0.6 | rutile | $Cl^-$ & $Al^{3+}$ |
| 7 | 7.40 | 0.5-1.0 | rutile | $Cl^-$ & $Al^{3+}$ |
| 8 | 7.30 | 0.1-0.4 | rutile | $Cl^-$ & $Al^{3+}$ |
| 9 | 7.50 | 0.2-0.5 | rutile | $Cl^-$ & $Al^{3+}$ |
| 10 | 7.70 | 0.005-0.1 | anatase | $Cl^-$ & $Na^+$ |
| 11 | 10.4 | 0.3-0.6 | rutile | $Na^+$, $Cl^-$ & $Al^{3+}$ |
| 12 | 10.5 | 0.5-1.0 | rutile | $Na^+$, $Cl^-$ & $Al^{3+}$ |
| 13 | 10.1 | 0.1-0.4 | rutile | $Na^+$, $Cl^-$ & $Al^{3+}$ |
| 14 | 10.3 | 0.2-0.5 | rutile | $Na^+$, $Cl^-$ & $Al^{3+}$ |
| 15 | 12.5 | 0.005-0.1 | anatase | $Cl^-$ & $Na^+$ |

The present teachings are further illustrated with reference to the following examples which are intended to exemplify, not limit, the present teachings.

EXAMPLES

To examine the effectiveness of photocatalysts prepared in accordance with the present teachings, three experimental setups were used. The first setup was a fixed bed reactor 10 comprising an open flow system that operates as shown in the flowchart depicted in FIG. 1. The fixed bed reactor can comprise a photocatalysis reactor 12 that is open at opposing ends. A flow of gas, such as purging gas, carrying organic molecules, flows at a controlled rate into photocatalysis reactor 12. The gas enters at one end of photocatalysis reactor 12 and out an opposing end of photocatalysis reactor 12 through a vent 16. In some embodiments, a mass controller can be used to control the flow rate. The feed stream, or gas stream, flowing into photocatalysis reactor 12, is analyzed by gas chromatography-mass spectrometry (GC-MS) equipment 14 as is the product stream, or gas stream, flowing out of photocatalysis reactor 12.

Figure 2:
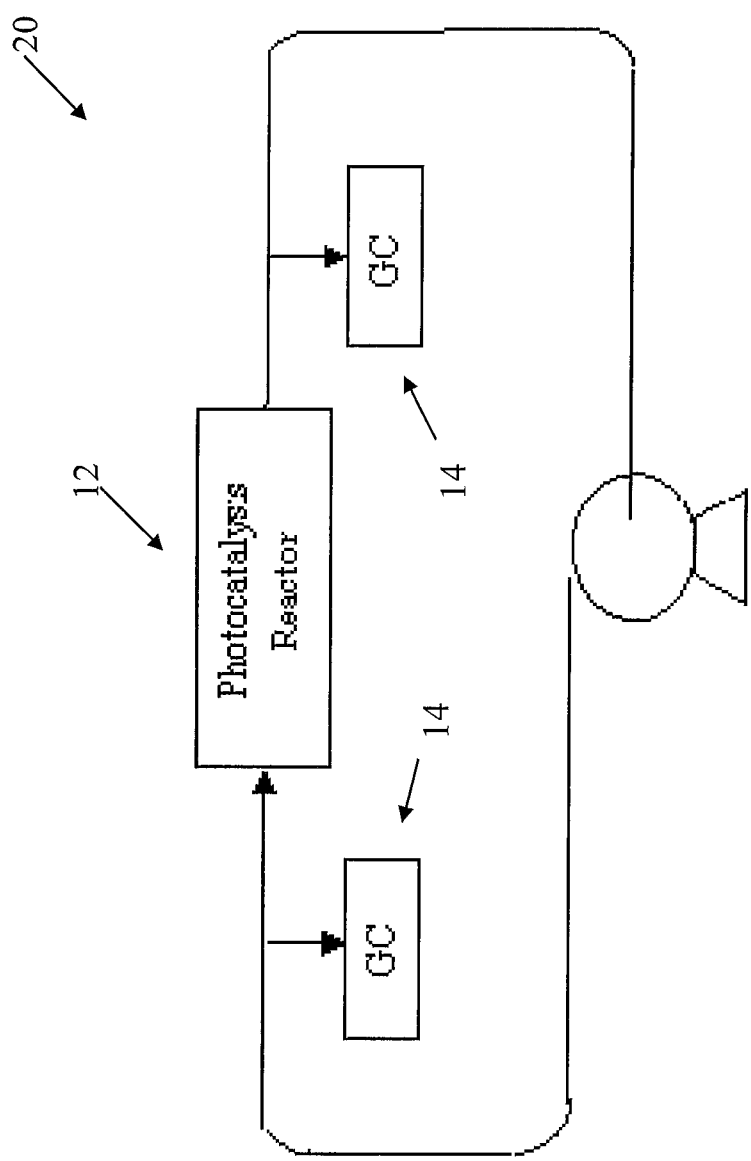
FIG. 2 is a schematic diagram showing another photocatalysis reaction setup comprising a closed loop setup for testing catalytic activity, according to various embodiments of the present teachings.
Figure 3:
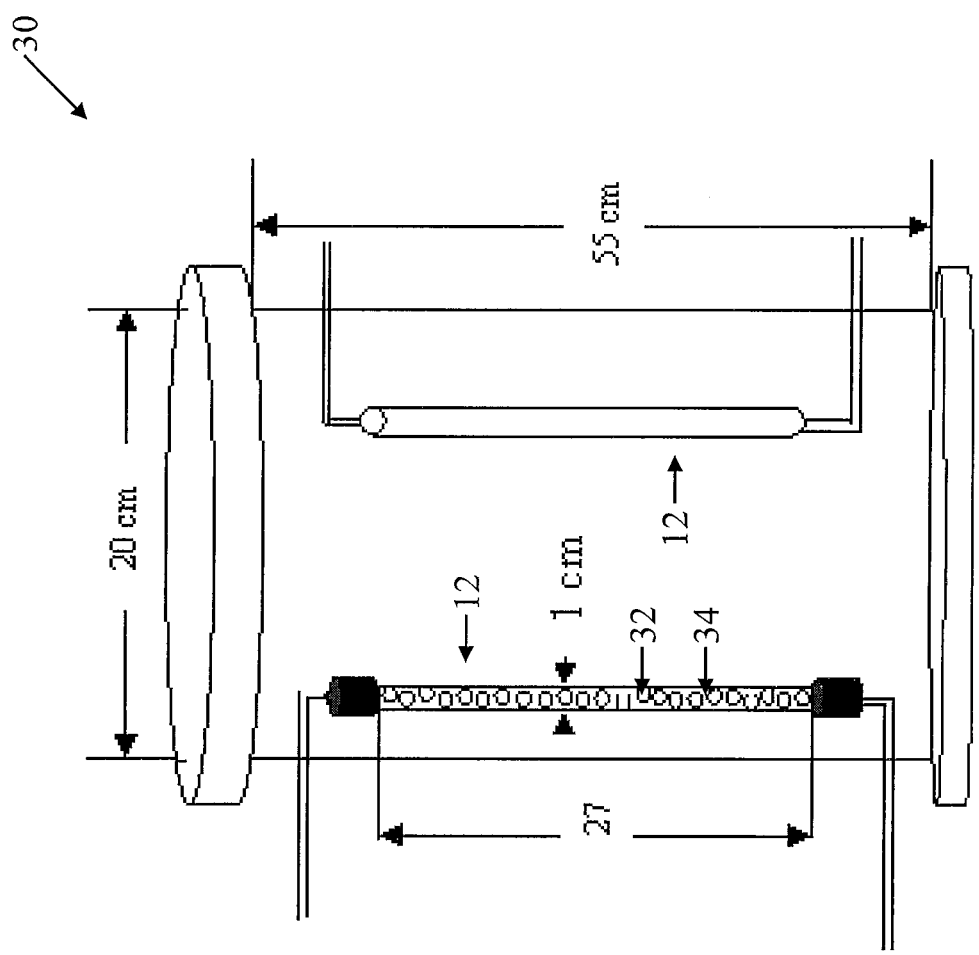
FIG. 3 is a schematic diagram showing a photocatalysis reactor according to various embodiments of the present teachings, useful in open flow and closed loop systems.

The second setup, like the first setup, comprises a fixed bed reactor 20. Unlike the second setup, however, the second setup comprises a closed flow system. After the product stream is analyzed by GC-MS equipment 14, it is recirculated through photocatalysis reactor 12 (closed system), as shown in FIG. 2. Photocatalysis reactor 12 can be identical in both the first and second setups. As shown in FIG. 3, photocatalysis reactor 12 can comprise a glass tubular reactor 32 made, for example, from PYREX glass. Tubular reactor 32 can be filled with glass beads 34 followed by introduction of about 3 grams of titanium dioxide photocatalyst material. After the photocatalyst is disposed within tubular reactor 32, tubular reactor 32 can be placed in a UV-cabinet, or container, that enables the entry of UV light only. FIG. 3 shows photocatalyst reactor 12 disposed within a UV cabinet.

Figure 4:
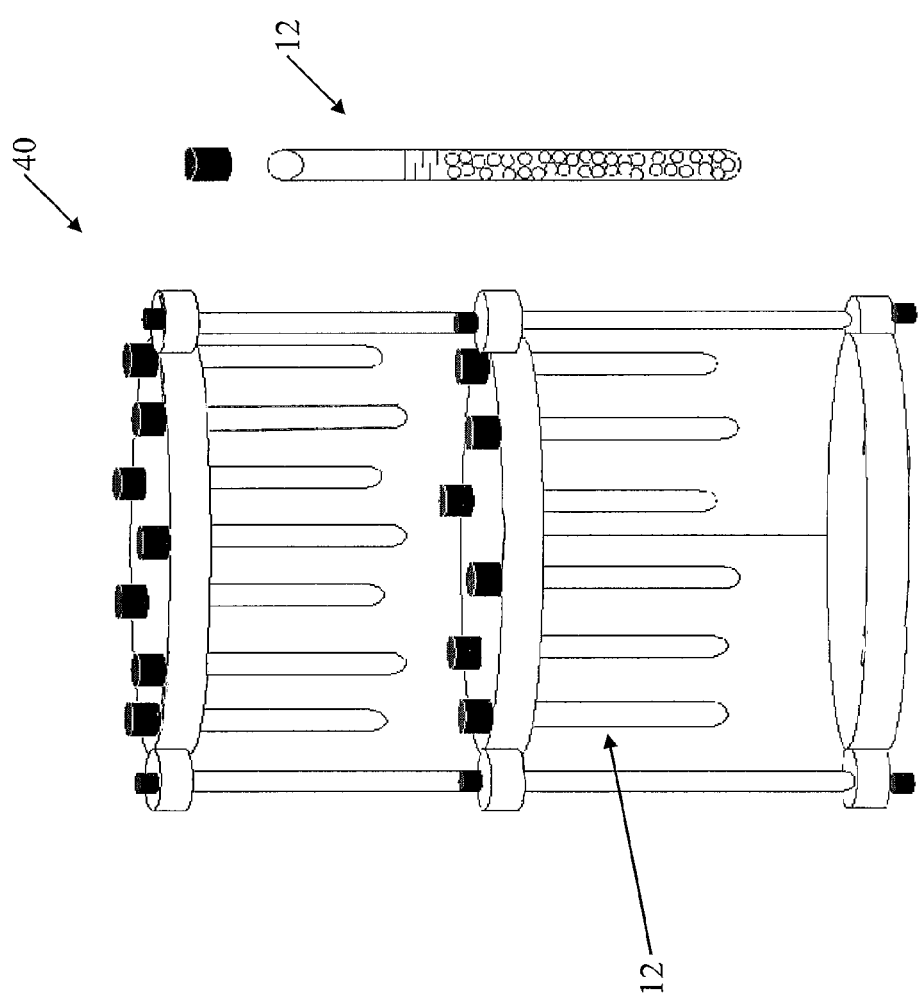
FIG. 4 is a schematic diagram showing a batch reactor system, according to various embodiments of the present teachings.

FIG. 4 shows a batch reactor system 40 comprising a plurality of photocatalysis reactors 12. Batch reactor system 40 can be used to determine the performance of photocatalysts with respect to liquid phase waste materials. The reacting medium can comprise, for example, a phenol/water system. For the experimental setups described herein, 13 mL of solution containing 40 ppm phenol in water and 0.1 grams of photocatalyst, were used. Photocatalysis reactors 12 were placed in the dark or light for a suitable time, then analyzed in a UV/VIS spectrometer.

Example 1

Ethane Adsorption on Activated Carbon

Date pits were immersed overnight in an aqueous solution comprising 5% $H_3PO_4$, then removed, and dried for six hours at 120° C. The treated date pits were then calcined for three hours at 850° C. in the presence of nitrogen, producing a sample of activated carbon. The produced sample of activated carbon had a surface area of 665 $m^2/g$. Two grams of the activated carbon sample were purged with 1% ethane/air gas at a flow rate of 0.1 ml/min to test its affinity as an efficient adsorbent. As shown in Table 3, ethane was not detected in the effluent stream for up to about 300 minutes. As such, it was determined that the activated carbon sample was an efficient adsorbent.

TABLE 3

Ethane Adsorption on Activated Carbon

| Sample | Surface area ($m^2/g$) | Eluted Ethane Area | Adsorption Time (min) |
|---|---|---|---|
| Activated Carbon (A) | 665 | 0 | 0 |
|  |  | 0 | 46 |
|  |  | 0 | 74 |
|  |  | 0 | 256 |
|  |  | 0 | 298 |
|  |  | 5411 | 309 |

Example 2

Phenol Adsorption on Activated Carbon

An activated carbon sample was prepared by a method similar to that described in Example 1, except that an aqueous solution comprising 10% $H_3PO_4$ was used, instead of a solution of 5% $H_3PO_4$. The activated carbon sample was tested for adsorption affinity to a phenol compound. A sample aqueous medium was prepared by mixing 40 ppm phenol aqueous solution with the activated carbon sample. A second aqueous medium containing a mixture of 40 ppm phenol aqueous solution and commercial activated carbon was also prepared, for comparison with the sample aqueous medium. The sample aqueous medium, the second aqueous medium, and a reference solution containing 40 ppm phenol solution were incubated in the dark (in the absence of UV light). Measurement readings using UV/VIS spectrophotometer were taken before and after incubation to monitor the presence of phenol in the aqueous medium, and the results are shown in Table 4.

As shown in Table 4, phenol adsorption of UV/VIS light between initial and final readings decreased. This can be explained by adsorption of phenol molecules by the activated carbon.

TABLE 4

Phenol Adsorption on Activated Carbon

| Sample | Surface area ($m^2/g$) | Initial Absorption Reading | Final Absorption Reading |
|---|---|---|---|
| Activated Carbon (A) | 665 | 2.31 | 0.83 |
| Commercial Activated Carbon | 689 | 2.31 | 0.70 |
| Standard Phenol Sample | — | 2.31 | 2.31 |

Example 3

Activity of Catalysts when Tested in Closed Loop Photocatalysis System

Activated carbon samples were prepared by the method described in Example 1. Each of $TiO_2$ Sample Nos. 3, 5, 6, and 10 were loaded into a respective activated carbon sample. A closed loop cycle reactor system, as shown in FIG. 2, was used to test the resulting photocatalyst. First, a photocatalysis reaction was performed in the dark, in the absence of UV light. One to three grams of the prepared photocatalyst was placed in each tubular reactor of the reactor system. The reactor system was then flushed with methane. The amount of methane left in the system was analyzed by GC-MS every 15 minutes. Then, a photocatalysis reaction was performed with UV lights on, that is, in the presence of UV light. The system was again flushed and filled with methane, and the methane was carried through the tubular reactors. The methane present in the system was analyzed by GC-MS every 15 minutes. The results are shown in Table 5.

TABLE 5

Activity of Catalysts When Tested in Closed Loop Photocatalysis System

| $TiO_2$ Sample Mixed to Make the Catalyst* | % of Methane analyzed in absence of UV-Light | % of Methane analyzed in presence of UV-Light |
|---|---|---|
| 3 | 99.16 | 0.00 |
| 5 | 63.31 | 0.00 |
| 6 | 25.44 | 0.49 |
| 10 | 71.73 | 0.46 |

*Catalysts calcined at 850° C. in Nitrogen atmosphere for 3.0 Hr.

Example 4

Reaction of Methane with Light Using Open Reactor System

An activated carbon sample was prepared by the same method described in Example 3, except that calcination was conducted in the presence of $CO_2$. Each of $TiO_2$ Sample Nos. 3, 5, 12, and 14 were loaded into a respective activated carbon sample. This time the photocatalysis reaction of methane was carried out in an open reactor system, as shown FIG. 1. The methane gas flow was controlled at 0.1 ml/min to 2 ml/min in the presence of UV light. The results are shown in Table 6.

TABLE 6

Reaction of Methane with Light Using Open System Reactor

| $TiO_2$ Sample Mixed to Make the Catalyst* | % of converted Methane |
|---|---|
| 3 | 73.07 |
| 5 | 99.30 |
| 12 | 87.98 |
| 14 | 56.47 |

*Catalysts calcined at 850° C. under Nitrogen for 3.0 Hr + $CO_2$ for 5 Min

Example 5

Photocatalytic Degradation of Phenol Under Sunlight

Activated carbon was prepared by the same method described in Example 4. Each of $TiO_2$ Sample Nos. 3, 4, 6, and 10 were loaded into a respective activated carbon sample. Photocatalytic degradation of phenol under sunlight was observed, using the batch reactor system, shown in FIG. 4. The results are shown in Table 7.

TABLE 7

Photocatalytic Degradation of Phenol Under Sun-Light

| TiO$_2$ Sample Mixed to Make the Catalyst* | % in converted Phenol (after 2 hrs) |
|---|---|
| 3 | 93.73 |
| 4 | 89.72 |
| 6 | 91.59 |
| 10 | 91.25 |

*Catalysts calcined at 850° C. in Nitrogen atmosphere for 3.0 Hr.

Example 6

Photocatalytic Degradation of Phenol Under Sunlight

Activated carbon was prepared by the same method described in Example 5. Each of TiO$_2$ Sample Nos. 3, 4, 6, and 10 were loaded into a respective activated carbon sample. Photocatalytic degradation of phenol under sunlight was observed, using the batch reactor system, shown in FIG. 4. The results are shown in Table 8.

TABLE 8

Photocatalytic Degradation of Phenol under sun-light

| TiO$_2$ Sample Mixed to Make the Catalyst* | % in converted Phenol (after 1 hrs) |
|---|---|
| 3 | 77.56 |
| 4 | 76.80 |
| 6 | 86.13 |
| 10 | 80.30 |

*Catalysts calcined at 850° C. under Nitrogen for 3.0 Hr + CO$_2$ for 5 Min

While the present teachings have been described in terms of exemplary embodiments, it is to be understood that changes and modifications can be made without departing from the true scope of the present teachings.

What is claimed is:

1. A method of adsorbing organic molecules, pollutants, or both, the method consisting essentially of:
    contacting date pits, removed from dates, with a phosphoric acid solution having a phosphoric acid concentration of from about 1% by weight to about 30% by weight, to form treated date pits;
    drying the treated date pits to form treated, dried date pits;
    calcining the treated, dried date pits under conditions to cause the treated, dried date pits to thermally decompose and form activated carbon;
    pulverizing and screening the activated carbon;
    impregnating the activated carbon with titanium dioxide, to form a photocatalyst; and
    adsorbing organic molecules, pollutants, or both, by contacting the organic molecules, pollutants, or both, with the photocatalyst.

2. The method of claim 1, wherein the impregnating comprises impregnating the activated carbon with a solution comprising from 10% by weight to 50% by weight titanium dioxide, to form the photocatalyst.

3. The method of claim 1, wherein the impregnating comprises impregnating the activated carbon with a solution comprising from about 20% by weight to about 30%, by weight titanium dioxide, to form the photocatalyst.

4. The method of claim 1, comprising adsorbing organic molecules by contacting the organic molecules with the photocatalyst.

5. The method of claim 1, comprising adsorbing pollutants by contacting the pollutants with the photocatalyst.

6. The method of claim 1, wherein the date pits removed from dates contain 7-10% oil when contacted with the phosphoric acid.

7. The method of claim 1, wherein the concentration of phosphoric acid in the phosphoric acid solution is from about 5% by weight to about 20% by weight.

8. The method of claim 1, wherein the drying comprises treating the date pits at a temperature of from about 80° C. to about 150° C., for a period of from about 1 hour to about 12 hours, to dry the treated date pits, prior to the calcining.

9. The method of claim 1, wherein the calcining occurs at a temperature of from about 300° C. to about 900° C.

10. The method of claim 1, wherein the calcining is conducted under a nitrogen blanket.

11. The method of claim 1, wherein the calcining is conducted under a nitrogen blanket to form a calcined product, and the method further comprises treating the calcined product with carbon dioxide gas.

12. The method of claim 1, wherein the impregnating the activated carbon comprises impregnating the activated carbon with a solution of titanium dioxide, to form the photocatalyst.

13. The method of claim 1, wherein the calcining occurs at a temperature of 850° C. in the presence of nitrogen.

14. A method consisting essentially of:
    contacting date pits, removed from dates, with a phosphoric acid solution having a phosphoric acid concentration of from about 1% by weight to about 30% by weight, to form treated date pits;
    drying the treated date pits to form treated, dried date pits;
    heating the treated, dried date pits under conditions to cause the treated, dried date pits to thermally decompose and form activated carbon;
    pulverizing and screening the activated carbon;
    impregnating the activated carbon with titanium dioxide, to form a photocatalyst; and
    adsorbing organic molecules, pollutants, or both, by contacting the organic molecules, pollutants, or both, with the photocatalyst.

15. The method of claim 14, wherein the impregnating comprises impregnating the activated carbon with a solution comprising from 10% by weight to 50% by weight titanium dioxide, to form the photocatalyst.

16. The method of claim 14, wherein the impregnating comprises impregnating the activated carbon with a solution comprising from about 20% by weight to about 30%, by weight titanium dioxide, to form the photocatalyst.

17. The method of claim 14, wherein the phosphoric acid solution has a concentration of phosphoric acid of 5% by weight.

18. The method of claim 14, wherein the phosphoric acid solution has a concentration of phosphoric acid of 10% by weight.

19. The method of claim 14, wherein the date pits removed from dates contain 7-10% oil when contacted with the phosphoric acid.

* * * * *